(12) United States Patent
Gettemy et al.

(10) Patent No.: US 9,244,215 B2
(45) Date of Patent: Jan. 26, 2016

(54) CHASSIS FOR DISPLAY BACKLIGHT

(75) Inventors: Shawn R. Gettemy, San Jose, CA (US);
Joshua G. Wurzel, Sunnyvale, CA (US);
David A. Doyle, San Francisco, CA
(US); Alexander D. Schlaupitz, Santa
Clara, CA (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 13/229,418

(22) Filed: Sep. 9, 2011

(65) Prior Publication Data

US 2013/0063978 A1    Mar. 14, 2013

(51) Int. Cl.
*F21V 8/00*    (2006.01)
*G02F 1/1333*  (2006.01)

(52) U.S. Cl.
CPC ............ *G02B 6/0088* (2013.01); *G02B 6/0031*
(2013.01); *G02B 6/0065* (2013.01); *G02F 2001/133314* (2013.01); *G02F 2001/133317* (2013.01)

(58) Field of Classification Search
CPC ........ G02F 2001/133317; G02F 2001/133314;
G02F 2001/133322; G02F 1/133615; G02F
1/133308; G02B 6/0088; G02B 6/0091;
G02B 6/0093; F21V 15/013
USPC .......................................... 362/632–634, 608
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |

(Continued)

FOREIGN PATENT DOCUMENTS

| | | |
|---|---|---|
| JP | 62204228 | 9/1987 |
| JP | 04115600 | 4/1992 |

(Continued)

OTHER PUBLICATIONS

3M Optical Systems Brochure (2010) "Vikuiti Enhanced Specular Reflector (ESR)".*

(Continued)

*Primary Examiner* — Robert May
(74) *Attorney, Agent, or Firm* — Treyz Law Group, P.C.; G. Victor Treyz; Zachary D. Hadd

(57) ABSTRACT

An electronic device may be provided with a display. Backlight structures may be used to provide backlight for the display. The backlight structures may include a light guide plate. A rectangular ring-shaped chassis may have a rectangular opening that receives the light guide plate. One or more edges of the chassis may be provided with an array of notches that receive light-emitting diodes or other light sources. The light sources may launch light into edge portions of the light guide plate. The chassis may include a first plastic structure such as a light reflecting structure formed from a material such as white plastic. The first plastic structure may surround two or more peripheral edges of the light guide plate. The chassis may also include a second plastic structure such as a light blocking structure formed from a material such as black plastic that helps prevent light leakage.

19 Claims, 17 Drawing Sheets

(56) References Cited

U.S. PATENT DOCUMENTS

| | | | |
|---|---|---|---|
| 6,323,846 B1 | 11/2001 | Westerman et al. | |
| 6,685,330 B2 * | 2/2004 | Miyazaki | 362/610 |
| 6,690,387 B2 | 2/2004 | Zimmerman et al. | |
| 6,753,843 B2 | 6/2004 | Wang | |
| 6,753,937 B2 | 6/2004 | Grupp | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 7,740,387 B2 * | 6/2010 | Schultz et al. | 362/606 |
| 7,948,573 B2 | 5/2011 | Kang et al. | |
| 7,969,741 B2 * | 6/2011 | Hayakawa et al. | 361/708 |
| 8,031,290 B2 | 10/2011 | Fu | |
| 8,109,667 B2 * | 2/2012 | Wang et al. | 362/633 |
| 8,253,875 B2 * | 8/2012 | Kim | 349/58 |
| 8,398,286 B2 * | 3/2013 | Chang | 362/606 |
| 2005/0185422 A1 * | 8/2005 | Henriet et al. | 362/615 |
| 2006/0026521 A1 | 2/2006 | Hotelling et al. | |
| 2006/0197753 A1 | 9/2006 | Hotelling | |
| 2006/0250820 A1 * | 11/2006 | Kuo | 362/623 |
| 2007/0030420 A1 | 2/2007 | Jang | |
| 2007/0030699 A1 * | 2/2007 | Tseng et al. | 362/633 |
| 2007/0046859 A1 | 3/2007 | Huang et al. | |
| 2007/0064448 A1 * | 3/2007 | Yu et al. | 362/633 |
| 2008/0204624 A1 * | 8/2008 | Fu | 349/58 |
| 2010/0182308 A1 | 7/2010 | Holman et al. | |
| 2011/0255023 A1 | 10/2011 | Doyle et al. | |
| 2012/0063167 A1 | 3/2012 | Ozawa et al. | |
| 2012/0063168 A1 * | 3/2012 | Nambu et al. | 362/609 |

FOREIGN PATENT DOCUMENTS

| | | |
|---|---|---|
| JP | 9-292533 | 11/1997 |
| JP | 2000163031 | 6/2000 |
| JP | 2002342033 | 11/2002 |
| JP | 2006047795 | 2/2006 |
| JP | 2006269445 | 10/2006 |
| JP | 2008129240 | 6/2008 |
| JP | 2009053399 | 3/2009 |
| JP | 2009-250988 | 10/2009 |
| JP | 2010-117642 | 5/2010 |
| JP | 2010117643 | 5/2010 |
| JP | 2012-059372 | 3/2012 |
| WO | WO 2007026439 A1 * | 3/2007 |
| WO | 2013/036334 | 3/2013 |

OTHER PUBLICATIONS

Lee et al., (Apr. 1985). "A Multi-Touch Three Dimensional Touch-Sensitive Tablet," Proceedings of CHI: ACM Conference on Human Factors in Computing Systems, pp. 21-25.

Rubine, (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, (May 1992). "Combining Gestures and Direct Manipulation," CHI '92, pp. 659-660.

Hotelling, U.S. Appl. No. 12/851,401, filed Aug. 6, 2010.

Westerman, (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Martisauskas et al., U.S. Appl. No. 13/167,663, filed Jun. 23, 2011.

* cited by examiner

CHASSIS FOR DISPLAY BACKLIGHT

BACKGROUND

This relates generally to electronic devices and, more particularly, to displays for electronic devices.

Electronic devices such as cellular telephones, computers, and media players often contain displays. For example, electronic devices often include backlit displays such as backlit liquid crystal displays.

Backlit displays generally include a light distribution layer called a light guide plate. The light guide plate is typically formed from a rectangular sheet of clear plastic that has been injection molded, extruded, or die cut from a sheet of plastic. Light from an array of light-emitting diodes may be launched into the edge of the light guide plate. The light guide plate distributes light across the back of a display panel by total internal reflection. Light that exits the planar upper surface of the light guide plate serves as backlight for the display panel.

The light guide plate is typically mounted within a white plastic chassis structure that is sometimes referred to as a p-chassis or moldframe. The white plastic of the p-chassis forms reflective sidewalls around the periphery of the light guide plate. Light that exits the edges of the light guide plate is reflected back into the light guide plate by the reflective sidewalls of the p-chassis. The reflected light may therefore serve as additional backlight for the display.

The use of reflective white plastic to form the p-chassis can improve backlight efficiency. However, the white plastic that forms the sidewalls of the p-chassis is generally unable to block all of the light that strikes the sidewalls. As a result, some of the light from the light guide plate can leak into undesired areas of an electronic device. If care is not taken, for example, leaking light may cause unwanted illumination in locations that are visible to a user of an electronic device.

It would therefore be desirable to be able to provide improved display backlight structures such as improved chassis structures for light guide plates in display backlights.

SUMMARY

An electronic device may be provided with a display. Backlight structures may be used to provide backlight for the display. The backlight structures may include a light guide plate. The backlight structures may be used in distributing backlight to structures in the display such as a thin-film transistor layer, a color filter layer, polarizers, and other display layers.

The structures in the display and backlight structures such as the light guide plate may have any suitable shape. For example, the display and the backlight structures in the display such as the light guide plate may be circular, may be oval, may be rectangular, may have outlines with curved edges, may have outlines with straight edges, may have shapes with combinations of straight and curved edges, or may have any other suitable shape.

The backlight structures may include a chassis with an opening that receives the light guide plate. One or more edges of the chassis may be provided with an array of notches that receive respective light-emitting diodes or other light sources. The light sources may launch light into edge portions of the light guide plate.

The chassis may include a light reflecting structure formed from a material such as plastic or metal. Plastic materials for the chassis may be relatively stiff polymers such as polycarbonate or may be relatively soft polymers such as synthetic rubber, natural rubber, silicone, or other elastomeric materials. A thin-film stack of dielectric materials may also be used to form the light reflecting structure. The light reflecting structure may surround two or more peripheral edges of the light guide plate and may help reflect escaping light back into the edges of the light guide plate. The chassis may also include a light blocking structure formed from a material such as black plastic that helps prevent light leakage from the chassis. The light reflecting and light blocking structures may be formed using tools such as plastic injection molding tools.

Further features of the invention, its nature and various advantages will be more apparent from the accompanying drawings and the following detailed description of the preferred embodiments.

DETAILED DESCRIPTION

Figure 1:
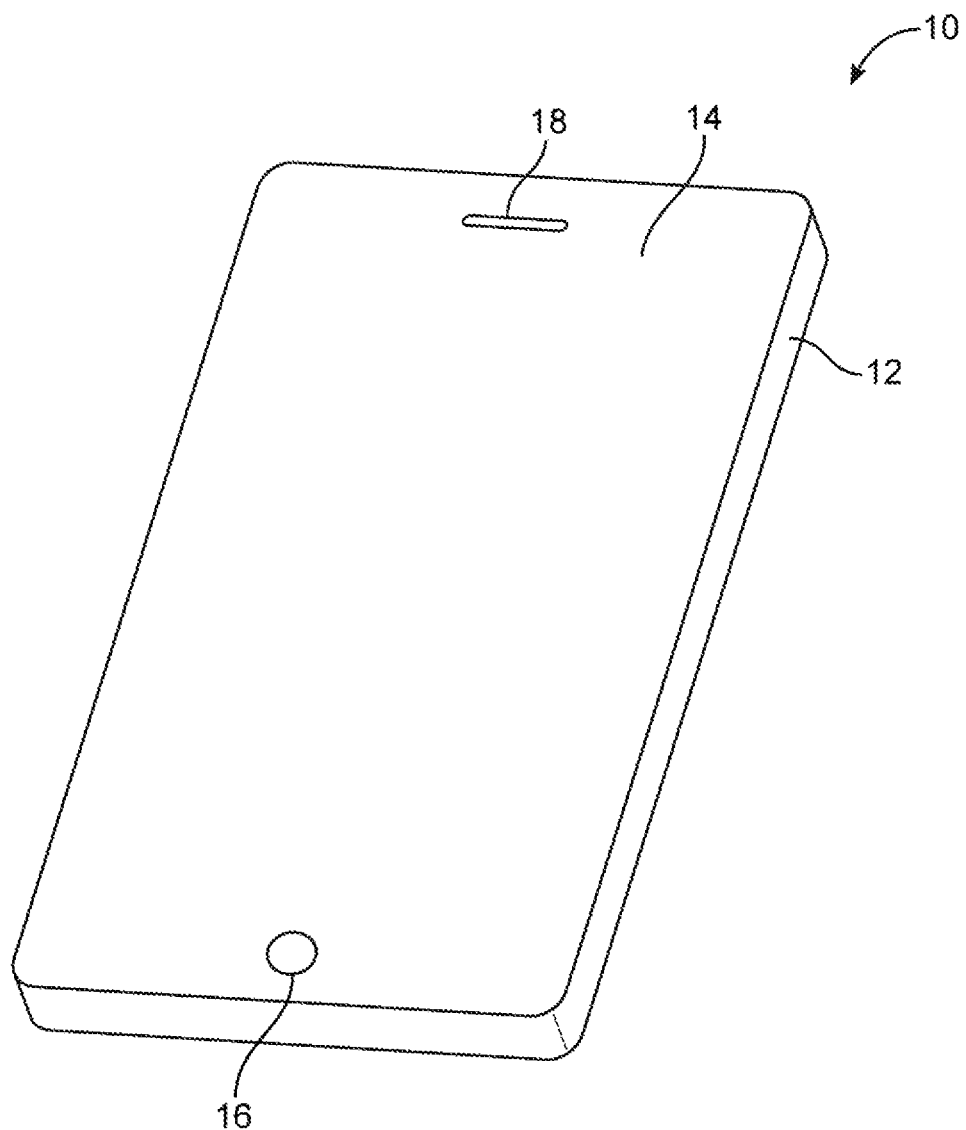
FIG. 1 is a perspective view of an illustrative electronic device with display backlight structures in accordance with an embodiment of the present invention.

Electronic devices such as device 10 of FIG. 1 may be provided with displays. A display in device 10 may contain backlight structures (sometimes referred to as a backlight unit or backlight) to provide backlight illumination for the display.

Device 10 of FIG. 1 may be a portable computer, tablet computer, computer monitor, handheld device, game equipment, global positioning system equipment, cellular telephone, or other electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

A display such as display 14 may be mounted in housing 12. For example, display 14 may be mounted on the front surface of device 10. Displays such as display 14 may also be mounted in other portions of housing 12 (e.g., in an upper housing in a computer with hinged upper and lower housing structures, on the rear of the housing, etc.).

Display 14 may be a touch screen that incorporates capacitive touch electrodes or a touch sensor formed using other types of touch technology (e.g., resistive touch, acoustic touch, force-sensor-based touch, etc.) or may be a display that is insensitive to touch input. Display 14 may include image pixels formed from liquid crystal display (LCD) components or other suitable image pixel structures.

Display 14 may be covered with a display cover layer such as a layer of cover glass or a transparent plastic layer. The active region of display 14 may lie within a central region of display 14. A peripheral ring-shape region surrounding the active display region may form an inactive region for display 14. Structures such as button 16 and speaker port 18 may, if desired, be formed in the inactive peripheral region of display 14 (as an example).

Figure 2:
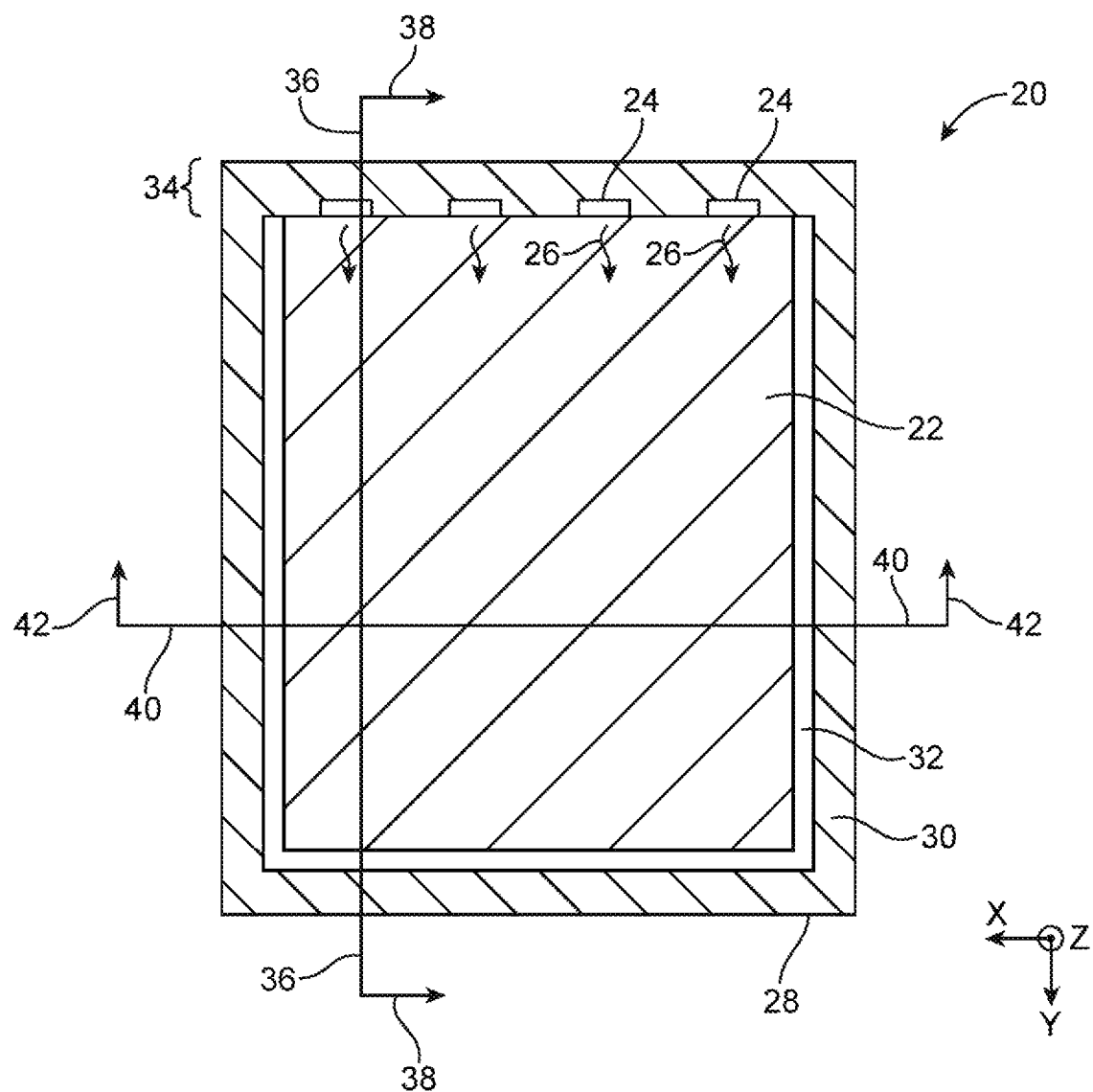
FIG. 2 is a top view of a portion of a backlight chassis structure in accordance with an embodiment of the present invention.

Backlight for display 14 may be provided using a backlight structure of the type shown in FIG. 2. As shown in FIG. 2, backlight structures 20 may include a light guide structure such as light guide plate 22. Display 14 may have any suitable shape. For example, display 14 may be circular, may be oval, may be rectangular, may have shapes with combinations of straight and/or curved edges, or may have any other suitable shape. Light guide plate 22 may be used in providing backlight for display 14 and may have a shape that matches the shape of display 14. For example, light guide plate 22 may be circular, may be oval, may be rectangular, may have shapes with combinations of straight and curved edges, or may have any other suitable shape.

Although display 14 may, in general, have any suitable shape, configurations for device 10 in which display 14 has a rectangular shape are sometimes described herein as an example. This is, however, merely illustrative. Display 14 and associated display structures such as light guide plate 22 may have any suitable shape.

As shown in FIG. 2, backlight 26 may be launched into one or more of the edges of light guide plate 22 (e.g., one or more of the four edges of a rectangular light guide plate) from light sources such as light-emitting diodes 24. In the example of FIG. 2, light-emitting diodes 24 are launching light 26 into the top edge of light guide plate 22. Other configurations may be used if desired (e.g., configurations in which light is launched into multiple edges of the light guide plate, etc.).

Light guide plate 22 may be formed from a transparent material such as glass or a polymer such as acrylic or other clear plastic (as an example). Light 26 is guided within light guide plate 22 due to the principle of total internal reflection. Some of light 26 is extracted from light guide plate 22 via engineered features on the upper surface of the light guide plate, the lower surface of the light guide plate, or both the upper and lower light guide plate surfaces. Downwardly directed light is reflected back into the light guide plate towards a viewer by a reflector layer under the light guide plate. Upwardly directed light travels through the active layers of display 14 that are formed above the backlight. For example, in a liquid crystal display, the upwardly directed light travels through a thin-film transistor layer, a color filter layer, and a layer of liquid crystal material that is interposed between the color filter layer and thin-film transistor layer. The color filter layer may be used to provide display pixels with different colors. The thin-film transistor layer may be used to control the transmission of individual pixels of the liquid crystal material. Backlight may pass through upper and lower polarizers that are formed above and below the color filter layer and thin-film transistor layer, respectively.

Light guide plate 22 may be mounted in a display backlight chassis such as chassis 28. Chassis 28 may have a rectangular ring shape with a rectangular central opening that receives rectangular light guide plate 22 or may have other suitable shapes. The periphery of chassis 28 may have a rectangular shape as shown in FIG. 2 (as an example).

Chassis 28 may be formed from two or more different materials. For example, chassis 28 may be formed form materials of different colors, materials with different light absorbing properties, materials with different surface finishes, materials with different light reflectivities, materials with different densities, materials with different hardnesses, or other different types of materials. Materials may be selected based on compatibility with surrounding structures, ease of assembly, cosmetics, optical properties, durability, or other suitable criteria.

Examples of materials that may be used in forming chassis 28 include plastic, metal, glass, ceramic, wood, carbon-fiber composites and other composites, other materials, and combinations of these materials. In some illustrative examples, one or more of the materials includes plastic. Plastic (polymer) materials for chassis 28 may be relatively stiff materials such as polycarbonate (PC), acrylonitrile butadiene styrene (ABS), or a PC/ABS blend or may be relatively soft polymers such as synthetic rubber, natural rubber, silicone, or other elastomeric materials. Rigid and elastomeric polymers are collectively referred to herein as "plastic."

With one illustrative arrangement, which is sometimes described herein as an example, the materials for chassis 28 may be selected for their light reflecting and light blocking capabilities. In particular, some of the material in chassis 28, such as material 30, may be configured to block light. Material 30, which may sometimes be referred to as light blocking material 30, light blocking layer 30, or light blocking structures 30, may be formed from an opaque material such as black plastic, dark grey plastic, dark colored plastic (e.g., plastic that is dark blue, dark brown, dark red, or other suitable colors), metal, or other materials that are optimized for preventing the transmission of light out of backlight chassis 28. Light transmission may be prevented by light absorption (e.g., light transmission may be prevented when a dark layer of plastic absorbs light that has penetrated into the dark layer of plastic) and/or may be prevented by reflection (e.g., light transmission may be prevented when a light blocking layer formed from a reflective metal blocks light by reflecting the light).

Other material in chassis 28 such as material 32 may be configured to reflect light. Material 32, which may sometimes be referred to as light reflection material 32, light reflecting layer 28, or light reflecting structures 32, may be formed from a layer of material that is optimized for reflecting light (e.g., plastic that is white, plastic that has a light color such as light yellow, light grey, light silver, etc.), may be formed from a metal layer, may be formed from a thin-film stack (e.g., a collection of dielectric layers or other layers), or may be formed from other reflecting structures.

With one suitable arrangement, light reflecting layer 32 is white and light blocking layer 30 is black, but other combinations of light reflecting and light blocking structures may be used in chassis 28 if desired. The reflectance of chassis structure 28, which is generally due primarily to the properties of light reflecting structure 32, may be about 70% or more, 80% or more, or 90% or more. The transmission of chassis structure 28, which is generally due primarily to the light blocking qualities of light blocking structure 30 may be less than 10%, less than 1%, or less than 0.1% (as examples). Viewed individually, the transmittance of light blocking material 30 will be less than the transmittance of light reflecting material 32 (for a given thickness) and light blocking material 30 will be more opaque than light reflecting material 32. As a result, the use of light blocking material 30 in chassis 28 can help reduce light leakage. The reflectance of light reflecting material 32 will be greater than the reflectance of light blocking material 30.

During operation of backlight structures 20, light 26 is launched into the interior of light guide plate 22 from light-emitting diodes 24. When light 26 reaches one of the edges of light guide plate 22 such as the bottom edge in FIG. 2, light 26 may exit the light guide plate and strike light reflecting layer 32. Due to the presence of light reflecting layer 32, light is reflected back into the edge of light guide panel 22. The reflected light may therefore be extracted by features in the light guide panel to serve as backlight for display 14. In some configurations, light reflecting layer 32 may be formed from a material that tends to diffuse the light as it is reflected (e.g., white plastic or other materials that allow light to penetrate somewhat before being reflected). Because light is reflected, backlight is not wasted and overall backlight efficiency is enhanced.

Because of the white color or other light color of light reflecting structures 32, not all of light 26 may be reflected back into light guide plate 22. Nevertheless, light leakage may be eliminated or at least substantially reduced by the presence of light blocking material 30 around some or all of the exterior surfaces of chassis 28.

Light blocking material 30 may surround all four edges of chassis 28 or may surround a subset of these four edges. Light reflecting material 32 may be used to line the interior surfaces of some or of the four edges of chassis 28. For example, in the illustrative configuration of FIG. 2, top chassis segment 34 contains only light blocking material 30 and does not contain any light reflecting material 32.

Figure 3:
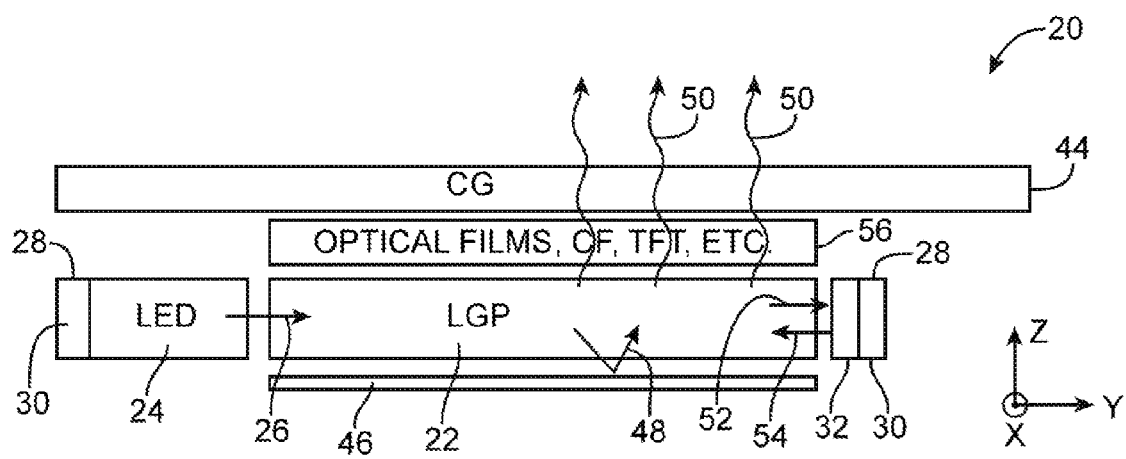
FIG. 3 is a cross-sectional side view of an illustrative display showing how a chassis structure of the type shown in FIG. 2 may reflect light and may block leaking light in accordance with an embodiment of the present invention.

A cross-sectional side view of backlight structures 20 of FIG. 2 taken along line 36 and viewed in direction 38 is shown in FIG. 3. As shown in FIG. 3, light 26 may be emitted in direction Y and may be launched into the edge of light guide plate 22 (e.g., the left-hand edge of plate 22 in the orientation of FIG. 3). Some of light 26 may be extracted in the downward direction towards the interior of device 10 and may reflect back in the upwards (Z) direction off of reflector 46, as indicated by light ray 48. Reflector 46 may be formed from a layer of white plastic, white paper, metal foil, or other suitable reflective surface. As indicated by light rays 50, some of light 26 such as light that has been extracted from light guide plate 22 in the upward direction and reflected light from reflector 46 passes vertically through display structures 56 and optional display cover layer 44. Display structures 56 may include diffuser films and other optical films, display module structures such as polarizers, a thin-film transistor glass layer, a color filter glass layer, a liquid crystal layer, and other display layers. Display cover layer 44 may be formed from glass or clear plastic (as examples). Surface features may be incorporated into light guide plate 22 to enhance light extraction efficiency (e.g., to enhance extraction at particular locations on the light guide plate).

Some of light 26 will be guided to the edge of light guide plate 22 due to the principle of total internal reflection. This light, which is shown as light ray 52 in the diagram of FIG. 3, reflects off of light reflecting structure 32 in chassis structure 28 and reenters the edge of light guide plate 22, as indicated by light ray 54. Light may be efficiently reflected (and backlight efficiency may be correspondingly high) because light reflecting layer 32 can be formed from a bright reflective material such as white plastic or lightly colored plastic. The white plastic (or other suitable material) that makes up light reflecting layer 32 may contribute both specular and diffuse components to reflected light 54 (e.g., about 50% of the light reflecting from layer 32 may be due to specular reflections and about 50% of the light reflecting from layer 32 may be due to diffuse reflections). The presence of light blocking layer 30 may help ensure that the amount of light that leaks from chassis structure 28 is minimized. By using an opaque material for light blocking (e.g., black plastic formed by incorporating carbon black or other dark materials into a plastic material), the thickness of layer 30 may be minimized while obtaining a desired degree of light leakage protection. The presence of light blocking layer 30 may therefore help to minimize the size of backlight structures 20 and device 10.

Figure 4:
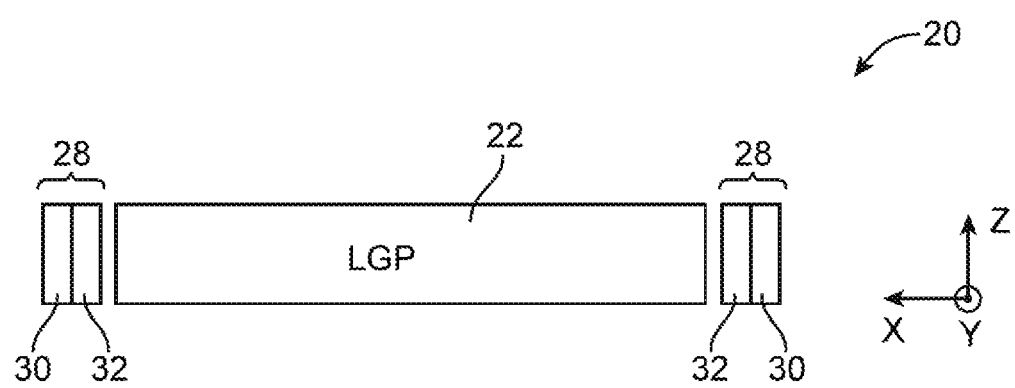
FIG. 4 is a cross-sectional side view of the chassis structure of FIG. 3 showing how sidewall structures on edges of a light guide plate may be provided with an inner material that reflects light and an outer material that blocks light in accordance with an embodiment of the present invention.

FIG. 4 is a cross-sectional view of backlight structures 20 of FIG. 2 taken along line 40 of FIG. 2 and viewed in direction 42. As shown in FIG. 4, light reflective layer 32 may be formed on the inner surface of chassis 28, facing the opposing outer peripheral edges of light guide plate 22. Light blocking layer 30 may be formed on the peripheral exterior surface of chassis 28 to help prevent light from leaking out of chassis 28.

Figure 5:
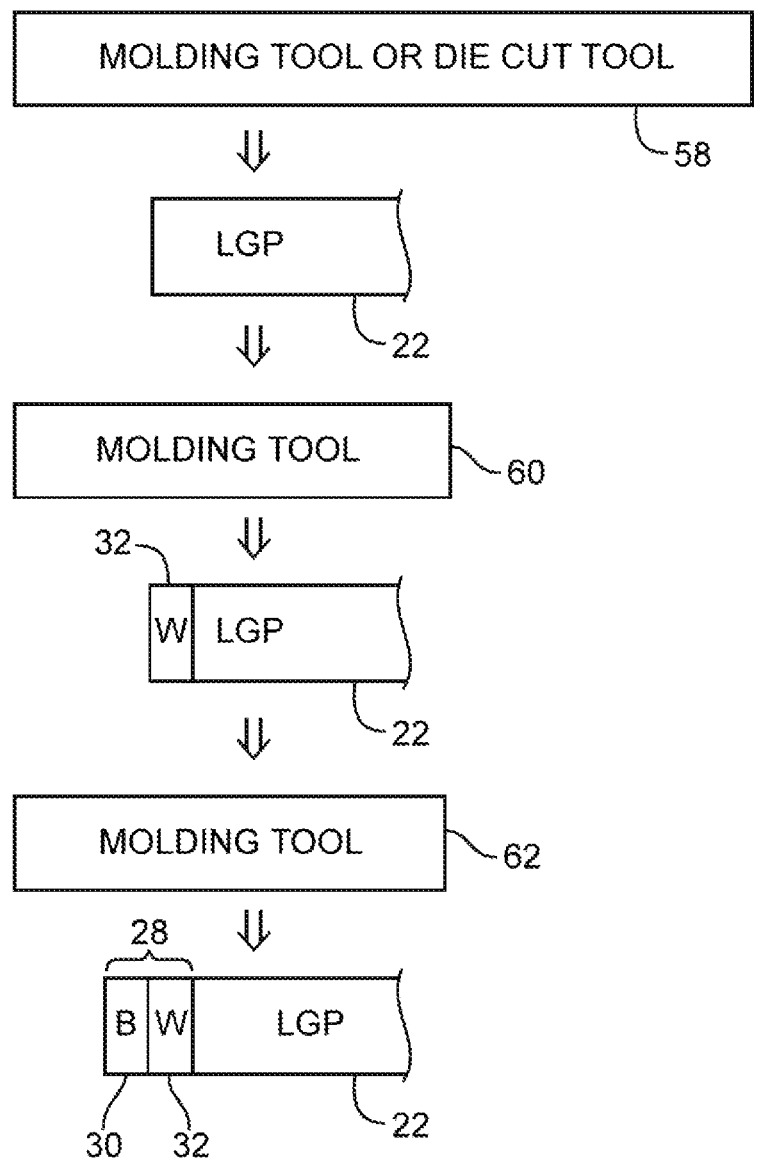
FIG. 5 is a diagram showing how injection molding techniques may be used in forming chassis structures for a display backlight in accordance with an embodiment of the present invention.

FIG. 5 is a diagram showing how backlight structures 20 for device 10 may be formed. As shown in FIG. 5, light guide plate 22 may be formed using equipment 58 such as a molding tool (e.g., to form a molded light guide plate) or a die cutting tool (e.g., to cut a rectangular light guide plate from a larger sheet of light guide material).

Molding tool 60 (e.g., plastic injection molding equipment) may then be used to mold a structure such as light reflecting structure 32 (e.g., white or lightly colored plastic) to the exterior edge of light guide plate 22.

Figure 6:
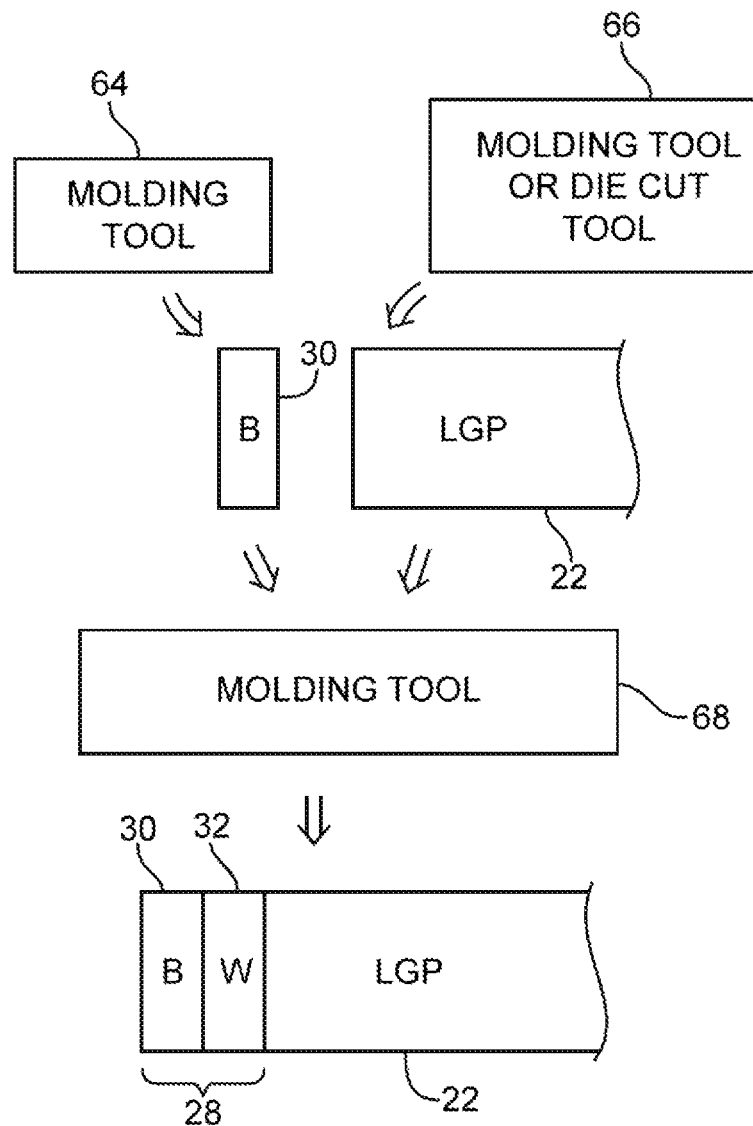
FIG. 6 is a diagram showing how layers of material such as plastics with different optical properties may be molded onto a display component such as a light guide plate in a backlight in accordance with an embodiment of the present invention.

If desired, light reflecting layer 32 may be injection molded into a mold that contains a previously formed light blocking structure 30 and a previously formed light guide plate 22. This type of arrangement is illustrated in FIG. 6. As shown in FIG. 6, molding equipment such as plastic injection molding tool 64 may be used to form light blocking structure 30 (e.g., a rectangular ring of black plastic) and equipment such as a molding tool or die cutting tool such as equipment 66 may be used to form light guide plate 22. Following formation of structure 30 and plate 22, structure 30 and plate 22 may be inserted into molding equipment such as plastic injection molding tool 68. Molding tool 68 may then be used to injection mold reflective plastic layer 32 (e.g., a layer of white plastic) between structure 30 and light guide plate 22 to form molded chassis structure 28 on the peripheral edge of light guide plate 22. In this type of arrangement, molded plastic-to-plastic interfaces are formed between the outer peripheral surface of structure 32 and the opposing inner surface of structure 30 and between the inner surface of structure 32 and the opposing outer peripheral edge of plate 22.

Figure 7:
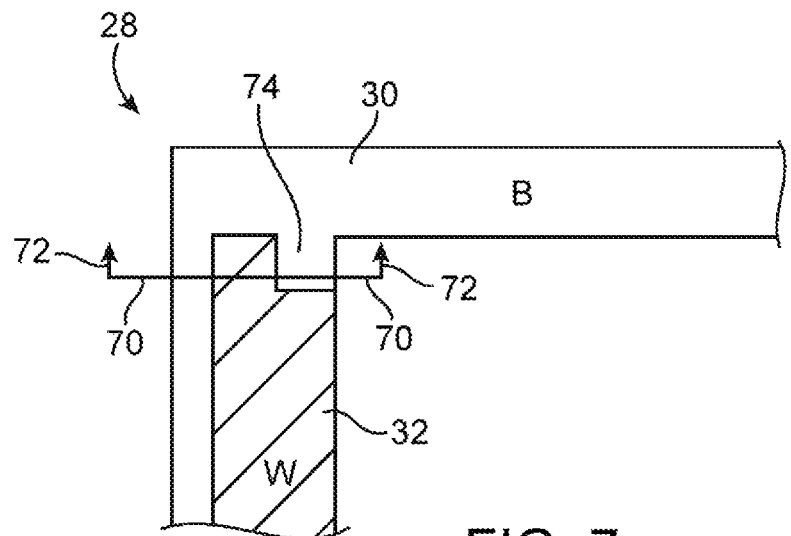
FIG. 7 is a top view of a corner portion of a chassis for a display backlight structure in accordance with an embodiment of the present invention.
Figure 8:
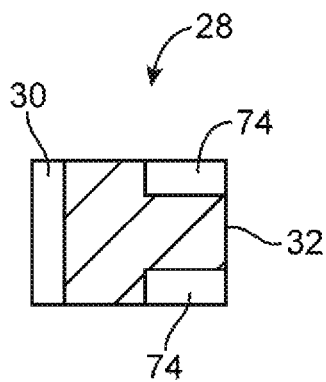
FIG. 8 is a cross-sectional end view of a sidewall portion of the chassis of FIG. 7 in accordance with an embodiment of the present invention.

Chassis 28 may have features that help control the flow of plastic during injection molding operations. As shown in FIG. 7, for example, light blocking layer 30 in chassis 28 may have features such as protrusion 74. FIG. 8 is a cross-sectional view of chassis 28 of FIG. 7 taken along line 70 and viewed in direction 72. As shown in FIG. 8, protrusions 74 may help contain plastic 32 during injection molding and may help form a satisfactory interlocking joint between plastic 30 and plastic 32 in the corner of chassis 28. Other types of interlocking and plastic flow control features may be incorporated into chassis 28 if desired. The example of FIGS. 7 and 8 is merely illustrative.

Figure 9:
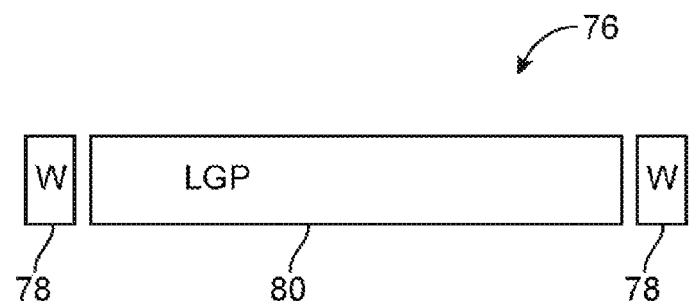
FIG. 9 is a cross-sectional view of a conventional backlight structure with a white plastic chassis.

A conventional backlight structure is shown in FIG. 9. As shown in the cross-sectional view of FIG. 9, backlight structure 76 has a white rectangular plastic chassis (chassis 78) that surrounds light guide plate 80. The sidewalls of chassis 28 can be thinner for a given amount of light blocking capability than the conventional sidewalls of chassis 78 due to the presence of light-blocking material 30 in chassis 28.

Figure 10:
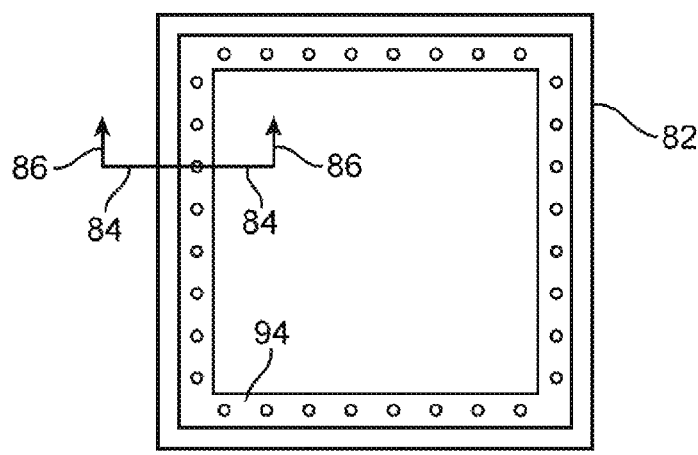
FIG. 10 is a top view of a conventional backlight chassis with a metal frame having holes and molded plastic that fills the holes.
Figure 11:
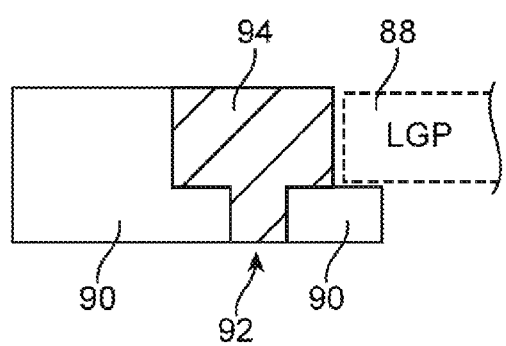
FIG. 11 is a cross-sectional view of a sidewall of the conventional chassis of FIG. 10.

Another conventional backlight structure is shown in FIGS. 10 and 11. Conventional backlight structure 82 of FIG. 10 has a metal chassis structure into which plastic 94 has been molded. A cross-sectional view of one of the sidewalls of the chassis of backlight structure 82 of FIG. 10 taken along line 84 and viewed in direction 86 is shown in FIG. 11. As shown in FIG. 11, light guide plate 88 has an edge that abuts plastic 94. Plastic 94 is molded onto metal chassis 90 and flows into holes 92 that are located in an array around the periphery of metal chassis 90.

Figure 12:
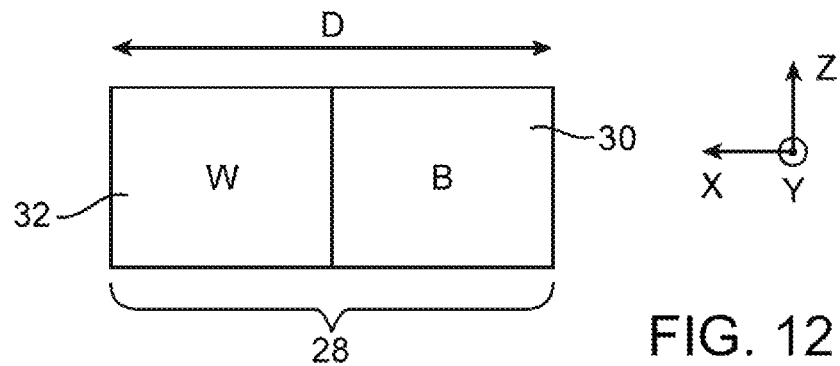
FIG. 12 is a cross-sectional view of a sidewall in a backlight chassis in accordance with an embodiment of the present invention.

As shown in FIG. 12, the sidewalls of chassis 28 may have a thickness D. To minimize the size of chassis 28, it may be desirable to use injection molding tools to mold chassis 28 such that dimension D is as small as possible. In other configurations, chassis 28 may be molded to larger than minimum dimensions. Dimension D may be, for example, 0.05 to 0.4 mm, 0.1 to 0.3 mm, 0.2 mm or more, or less than 0.5 mm (as examples). Other sizes may be used if desired (e.g., chassis 28 may be molded to a relatively large size to improve strength, etc.).

Figure 13:
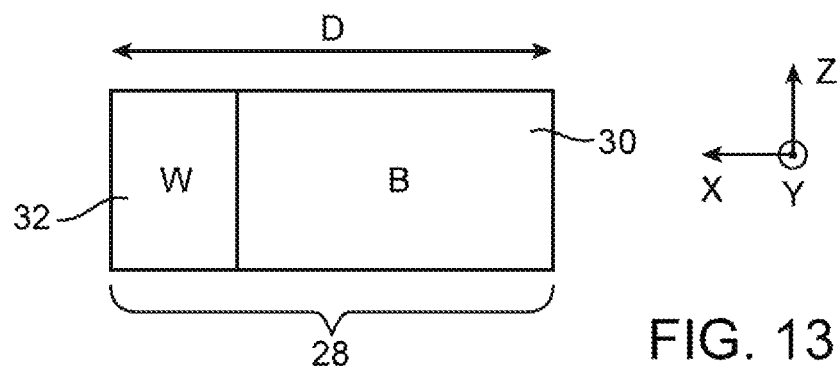
FIG. 13 is a cross-sectional view of a sidewall of the type shown in FIG. 12 in which the thickness of a light blocking layer has been increased and the thickness of a light reflecting layer has been decreased by a corresponding amount in accordance with an embodiment of the present invention.
Figure 14:
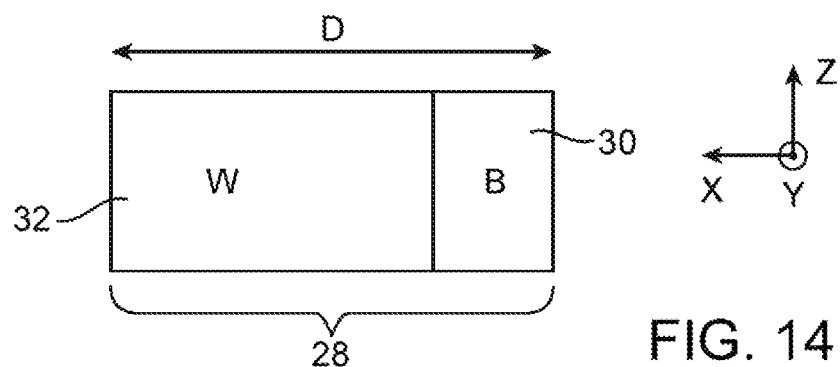
FIG. 14 is a cross-sectional view of a sidewall of the type shown in FIG. 12 in which the thickness of a light blocking layer has been decreased and the thickness of a light reflecting layer has been increased by a corresponding amount in accordance with an embodiment of the present invention.

In the configuration of FIG. 12, the thickness D (width in dimension X) of the sidewall of chassis 28 is formed from structures 32 and 30 with equal thicknesses (each being equal to D/2). FIG. 13 shows how the thickness of light blocking layer 30 may be increased (without enlarging the total thickness D of the sidewall) to enhance the light blocking capability of the chassis sidewall. FIG. 14 shows how the thickness of light reflecting layer 32 may be increased while decreasing the thickness of light blocking layer 30 by a corresponding amount. With this type of configuration, the size of the sidewall is maintained at thickness D (e.g., a minimum molding dimension), while increasing the reflectance of reflecting layer 32.

Figure 15:
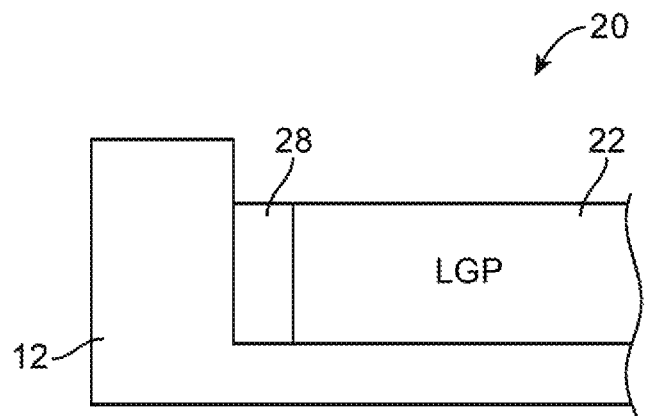
FIG. 15 is a cross-sectional view of a portion of a backlight structure showing how a light reflecting layer may be formed between an electronic device housing structure and a light guide plate in accordance with an embodiment of the present invention.

FIG. 15 is a cross-sectional view of illustrative backlight structures 20 for device 10 showing how chassis structure 28 may be injection molded into a gap formed between the peripheral edge of light guide plate 22 and the inner edge surface of housing structure 12. Chassis structure 28 may include a light reflecting layer, a light blocking layer, an inner light reflecting layer and an outer light blocking layer, or other suitable structures. With and arrangement of the type shown in FIG. 15, chassis 28 (e.g., layer 32 and optionally layer 30) may be formed as an integral portion of housing 12.

Figure 16:
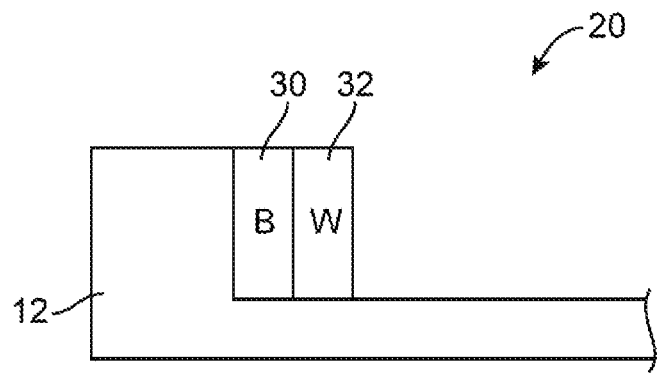
FIG. 16 is a cross-sectional view of a portion of a backlight structure showing how multiple layers of material such as a light blocking layer and a light reflecting layer may be formed on an electronic device housing structure in accordance with an embodiment of the present invention.

FIG. 16 is a cross-sectional view of backlight structures 20 in a configuration in which a light blocking layer such as layer 30 and a light reflecting layer such as layer 32 have been provided on the inner peripheral surface of housing 12 (e.g., by using successive injection molding operations to mold layers 30 and 32 onto housing 12 to form a chassis that is an integral portion of housing 12).

Figure 17:
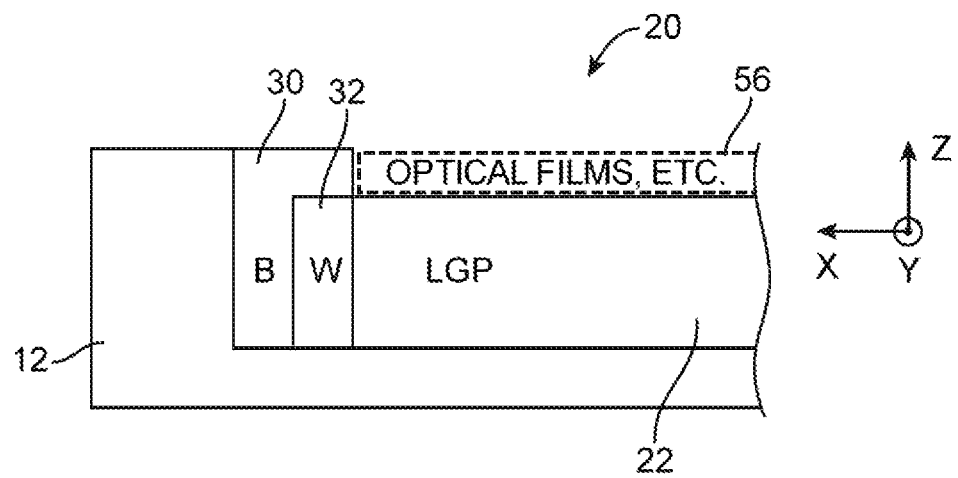
FIG. 17 is a cross-sectional side view of a portion of an electronic device having a light blocking layer and a light reflecting layer interposed between a peripheral edge of a light guide plate and an electronic device housing structure in accordance with an embodiment of the present invention.

FIG. 17 is a cross-sectional view of backlight structures 20 in a configuration in which light blocking layer 30 and light reflecting layer 32 have been injection molded onto the inner edge of housing 12. As shown in FIG. 17, light blocking layer 30 may have an overhang shape that covers an upper portion of light reflecting layer 32. Light reflecting layer 32 may have a vertical height (in dimension Z) that is substantially equal to (or slightly larger than) the vertical height (thickness) of light guide plate 22. Light blocking layer 30 may have a larger height to help contain stray light.

Figure 18:
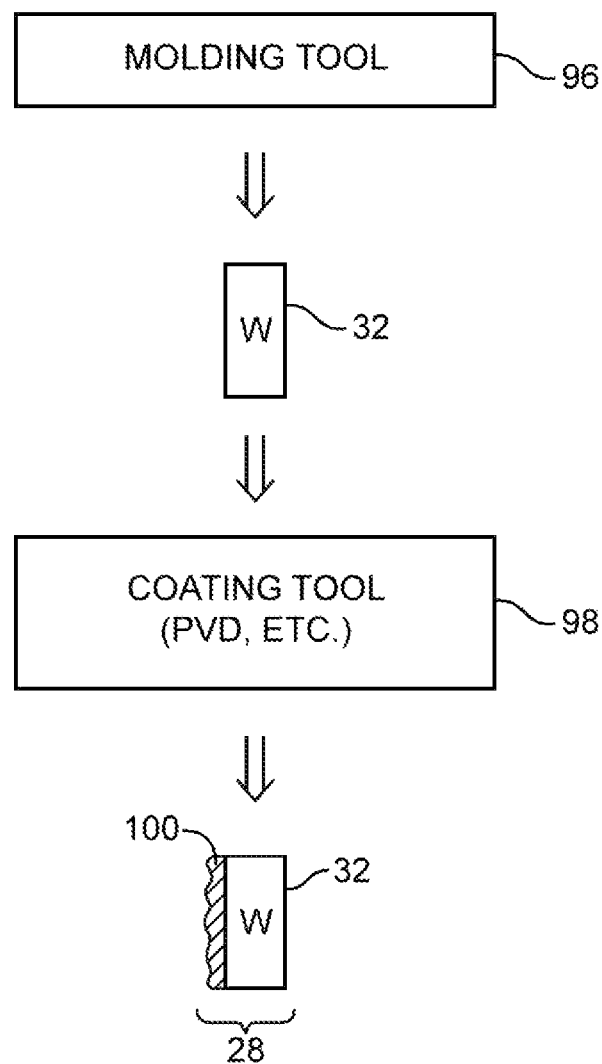
FIG. 18 is a diagram showing how a light blocking layer such as a coating of metal or other material may be coated on an exterior surface of a light reflecting layer in accordance with an embodiment of the present invention.

FIG. 18 shows how backlight chassis 28 may be formed by depositing an opaque layer of material on an exterior surface of light reflecting structure 32. As shown in FIG. 18, molding equipment such as plastic injection molding tool 96 may be used to form light reflecting structure 32 (e.g., a rectangular ring of white plastic). Coating tool 98 may then be used to coat an exterior surface of light reflecting structure 32 to form an opaque layer such as layer 100 that blocks light. Coating tool 98 may include equipment such as physical vapor deposition equipment (e.g., sputtering equipment, evaporation equipment, etc.) for depositing a layer of metal (e.g., a layer of aluminum or other metal having a thickness of less than 1 micron or other suitable thickness) on the surface of light reflecting layer 32. Other light blocking materials may be formed on the exterior surface of light reflecting layer 32 if desired. The formation of an opaque light blocking layer of metal (layer 100) in the example of FIG. 18 is merely illustrative.

Figure 19:
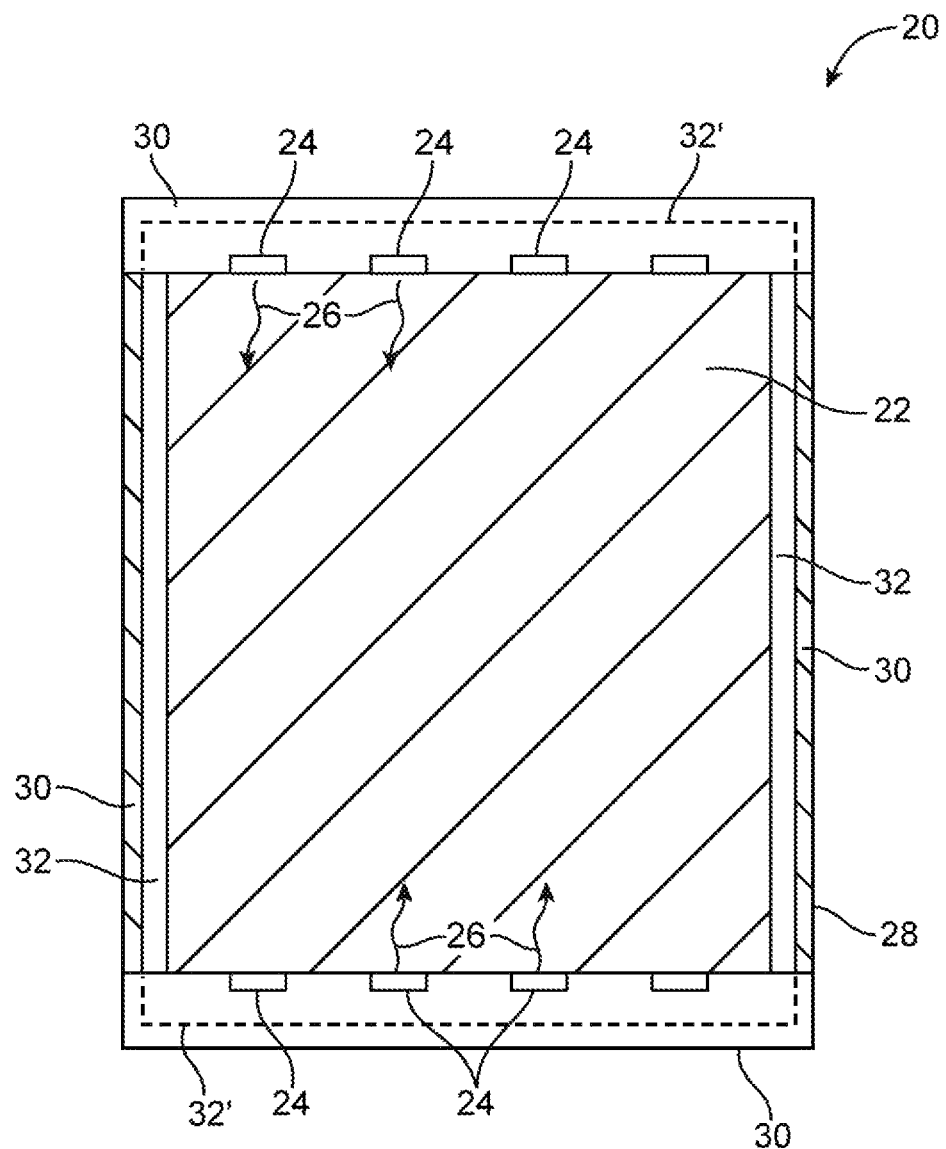
FIG. 19 is top view of an illustrative display backlight chassis structure that is configured to accommodate two opposing arrays of light-emitting diodes in accordance with an embodiment of the present invention.

As shown in FIG. 19, backlight structures 20 may include light sources that are located in arrays along opposing edges of light guide plate 22. In this type of configuration, one array of light sources (light-emitting diodes 24 along the top edge of plate 22 in FIG. 19) emits light in one direction, whereas the other array of light sources (light-emitting diodes 24 along the bottom edge of plate 22 in FIG. 19) emits light in the opposite direction. Chassis 28 may include multiple layers of plastic to enhance reflectivity while reducing light leakage. For example, chassis 28 may have multiple shots of plastic that have been injection molded into molds during multiple injection molding operations.

Chassis 28 may, for example, have an outer surface covered with light blocking material 30. Light reflecting material 32 may be used to coat some or all of the interior surface of light blocking material 30 in chassis 28. For example, light reflecting material 32 may coat the right and left interior surfaces of chassis 28 (in the orientation shown in FIG. 19) while only light blocking material 30 is present along the top and bottom edges of light guide plate 22. As indicated by lines 32', light reflecting material 32 may also be used to coat the inner surfaces of the top and bottom edges of chassis 28.

Figure 20:
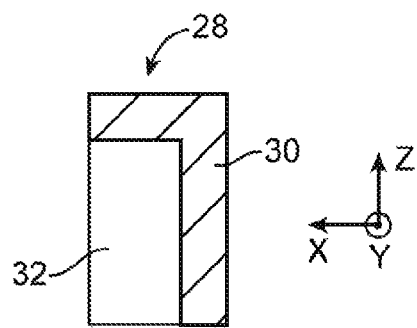
FIGS. 20, 21, 22, 23, 24, 25, and 26 are cross-sectional views of illustrative sidewall structures that may be used in backlight chassis structures in accordance with an embodiment of the present invention.
Figure 21:
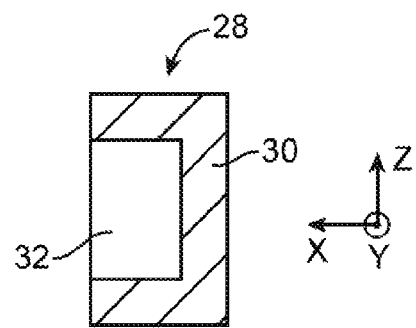
Figure 22:
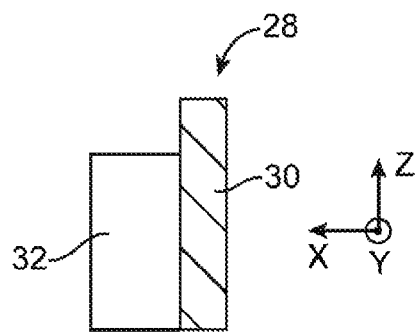
Figure 23:
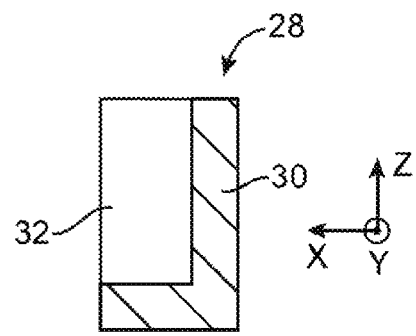
Figure 24:
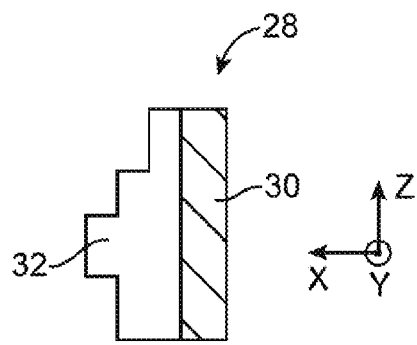
Figure 25:
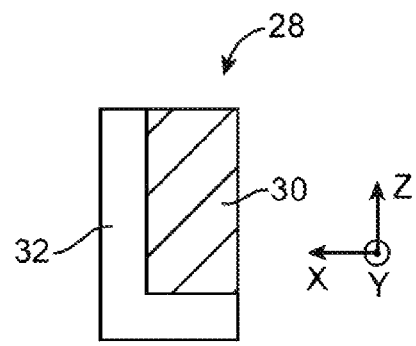
Figure 26:
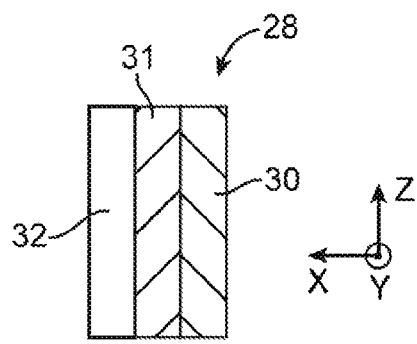

It is not necessary for the sidewalls of chassis 28 to be formed from equally sized and shaped light reflecting and light blocking structures 30 and 32. FIGS. 20-26 show illustrative sidewall configurations for chassis 28. In the example of FIG. 20, light blocking material 30 has an L-shaped cross sectional shape that overhangs a portion of light reflecting structure 32. In the example of FIG. 21, light blocking material 30 has a C-shaped cross-sectional shape that undercuts and overhangs light reflecting material 32. FIG. 22 is an example of a configuration in which light blocking material 30 and light reflecting material 32 have different heights (vertical thicknesses in dimension Z). In the FIG. 23 configuration, light blocking material 30 has an L-shape that undercuts light reflecting material 32. FIG. 24 is a cross-sectional view of chassis 28 in a configuration in which light reflecting material 32 has multiple steps and does not form a completely vertical inner sidewall surface for chassis 28. As shown in FIG. 25, light reflecting material 32 may be configured to undercut some or all of light blocking material 30. As shown in FIG. 26, chassis 28 may be formed from more than two separate shots of plastic (or other material layers). In particular, chassis 28 may include light reflective layer 32, light blocking layer 30, and one or more intermediate layers such as layer 31. Layer 31 may be formed from light reflecting material, light blocking material, injection molded plastic, material that aids in adhesion, material (e.g., metal) that provides strength, or other suitable materials.

Figure 27:
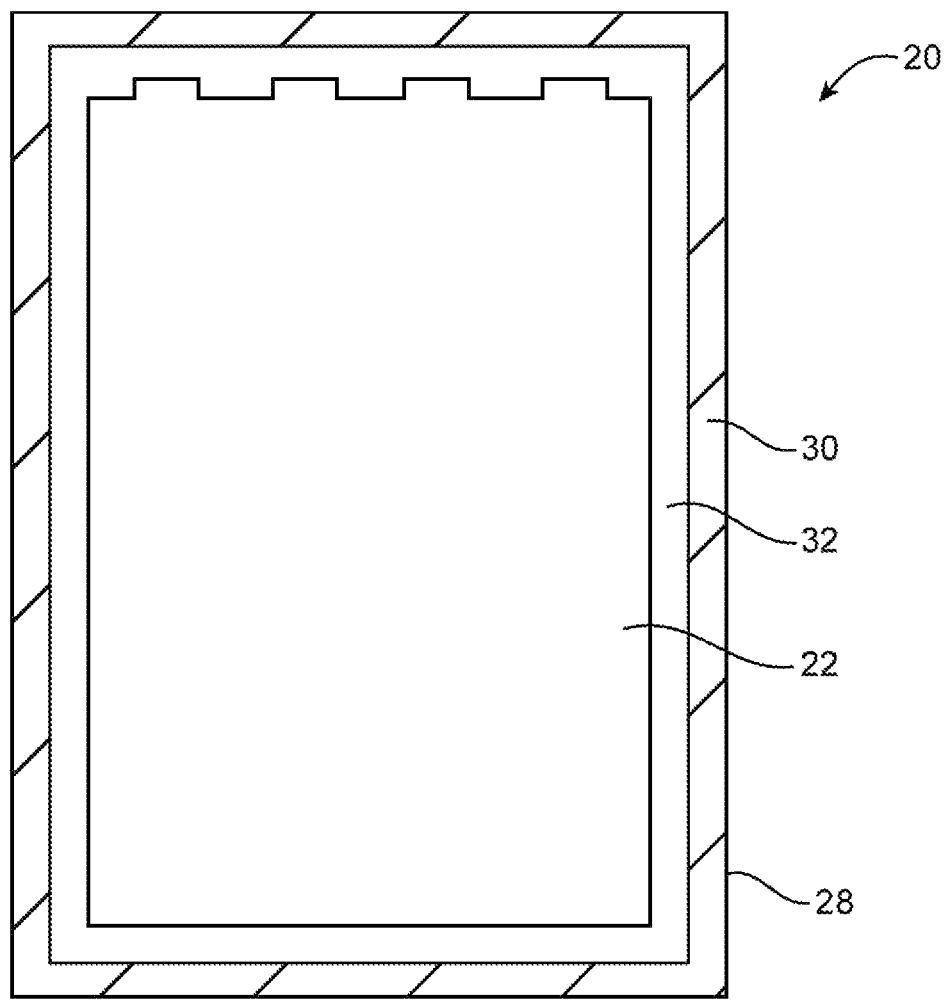
FIG. 27 is a top view of an illustrative backlight chassis structure having an inner ring of light reflecting material surrounded by an outer ring of light blocking material.
Figure 28:
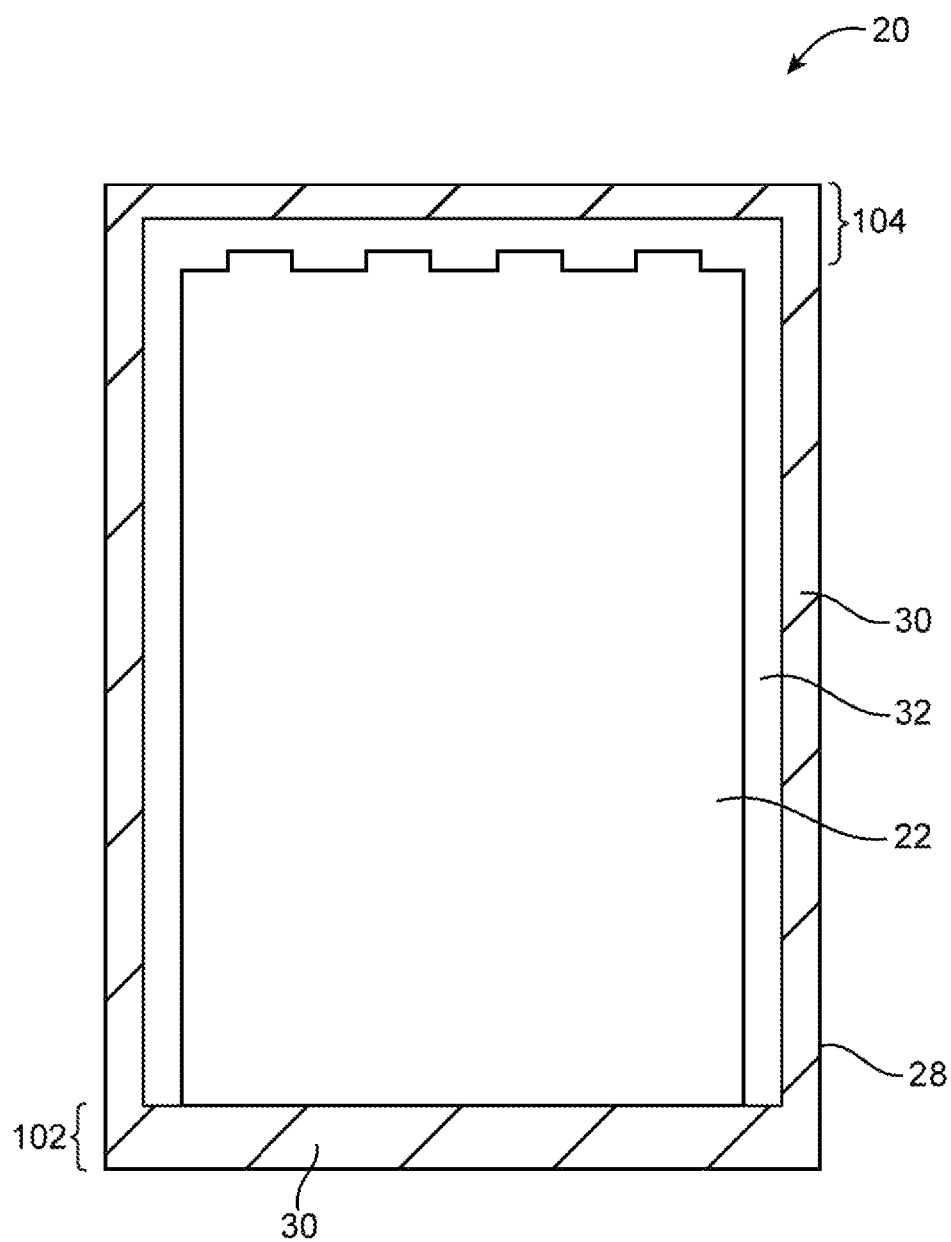
FIG. 28 is a top view of an illustrative backlight chassis structure having an outer ring of light blocking material and three segments of light reflecting material along three of the four inner edges of the backlight chassis structure in accordance with an embodiment of the present invention.

FIG. 27 is a top view of an arrangement for backlight structures 20 in which chassis 28 has an inner rectangular ring formed from light reflecting material 32 and a surrounding rectangular ring formed from light blocking material 30. As described in connection with FIG. 2 and FIG. 19, it is not necessary for the sidewall structures formed from light reflecting material 32 and light blocking material 30 to completely surround all four sides of the rectangular periphery of light guide plate 22. As shown in FIG. 28, for example, lower edge 102 of chassis 28 may be formed exclusively from a solid strip of light blocking material 30, whereas upper edge 104 and the left and right edges of chassis 28 may be formed from an inner layer of light reflecting material 32 covered with an outer layer of light blocking material 30.

Figure 29:
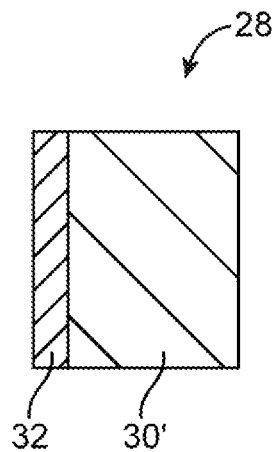
FIG. 29 is a cross-sectional view of illustrative sidewall structures for a backlight chassis in which a light reflecting layer has been formed from a reflective material such as metal in accordance with an embodiment of the present invention.

If desired, light reflecting material 32 may be formed from a reflective layer such as a layer of metal (e.g., aluminum, chromium, etc.). This type of configuration is shown in chassis 28 of FIG. 29. As shown in FIG. 29, light reflecting material 32 (which serves as the innermost material in chassis 28) may be formed from a thin (e.g., less than 1 micron thick) or thick (e.g., 0.05 to 1 mm) layer of metal. The metal layer for light reflecting material 32 of FIG. 29 may be supported by structures 30' or other suitable materials. Structures 30' may form the outermost material in chassis 28 (e.g., an exterior structure that runs around the outer periphery of chassis 28). Structures 30' may be formed from plastic such as light blocking black plastic or from other suitable materials (e.g., metals, ceramics, glass, etc.). Structures 30' may be used to help support reflective layer 32 and may, if desired, be omitted.

Figure 30:
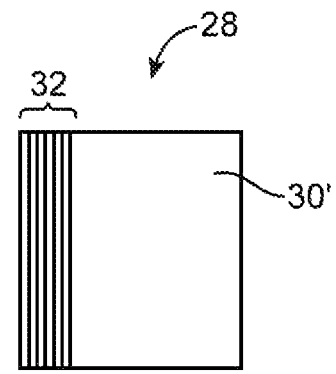
FIG. 30 is a cross-sectional side view of illustrative sidewall structures for a backlight chassis in which a light reflecting layer has been formed from a thin-film stack of materials in accordance with an embodiment of the present invention.

FIG. 30 is a cross-sectional side view of illustrative sidewall structures for backlight chassis 28 in which light reflecting layer 30 has been formed from a thin-film stack of materials on the inner surface of material 30'. Material 30' may be a light blocking material such as black plastic or may be any other suitable material (plastic, metal, etc.). Thin-film stack 32 may be formed from two or more layers of material (e.g., dielectric layers in an alternating high-index-of-refraction and low-index-of-refraction stack to form a reflector or filter, dielectric layers with other index of refraction patterns, etc.). Think-film stack 32 may include layers of dielectric such as polymer layers, glass layers, ceramic layer, or other dielectric layers and/or may include layers of other material (e.g., metal layers, etc.). Thin-film layers in thin-film stack 32 may be deposited using physical vapor deposition (e.g., sputtering, evaporation, etc.) or other suitable techniques. Thin-film thicknesses in the thin-film stack may be 100 angstroms to 10,000 angstroms or other suitable thicknesses.

Figure 31:
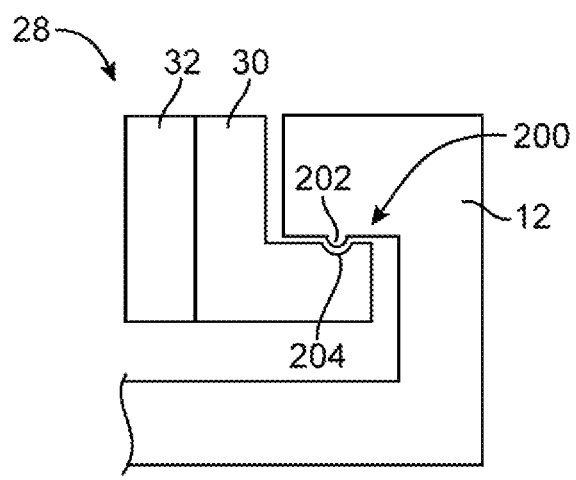
FIG. 31 is a cross-sectional side view of illustrative sidewall structures showing how a backlight chassis may be provided with structures such as features that engage with housing structures in accordance with an embodiment of the present invention.

FIG. 31 is a cross-sectional side view of illustrative sidewall structures showing how chassis 28 may, if desired, be provided with structures to facilitate mounting of chassis 28 to other device structures, to facilitate the attachment of other structures in device 10 to chassis 28, or for implementing other suitable functions. In the example of FIG. 31, chassis 28 has been provided with light reflecting layer 32 and light blocking layer 30. Chassis 28 may be configured to be attached to housing 12 (e.g., a housing sidewall or other housing structure formed from a material such as plastic, metal, etc.). In particular, light blocking structure 30 and housing 12 have been provided with mating engagement features 200. Engagement features 200 may include features such as protrusions and recesses. In the example of FIG. 31, housing 12 has been provided with a protrusion such as protrusion 202 and light blocking structure 30 has been provided with a mating recess such as recess 204. Other types of engagement features may be provided if desired. The configuration of FIG. 31 is merely illustrative.

In general, backlight structures and other device structures may be formed using any suitable equipment and assembly operations. An illustrative system in which backlight structures such as chassis 28 and/or other structures for device 10 can be formed is shown in FIG. 32.

Figure 32:
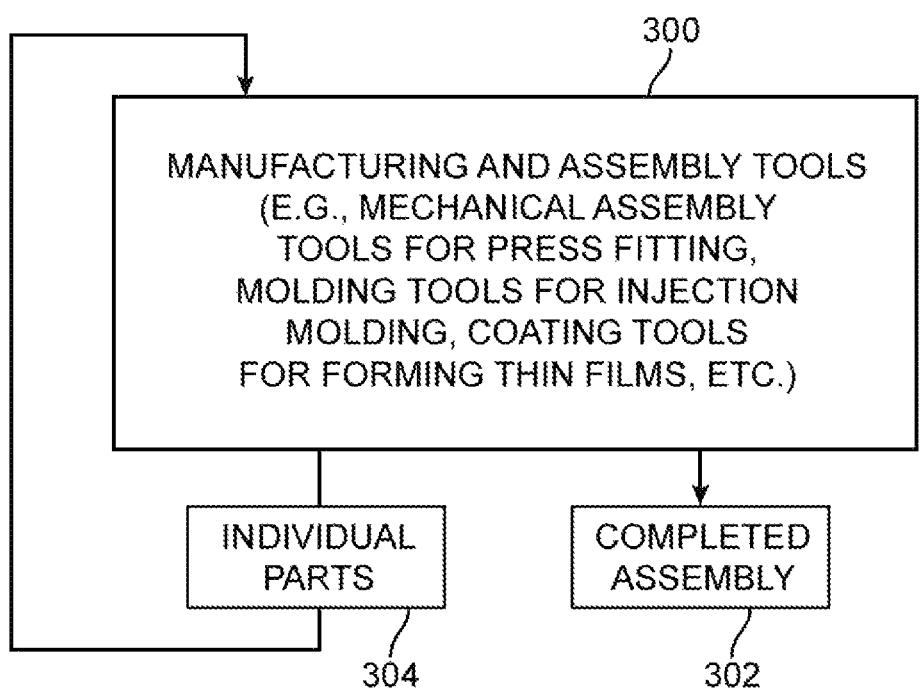
FIG. 32 is a diagram showing equipment that may be used in forming backlight chassis structures and other device structures in accordance with an embodiment of the present invention.

As shown in FIG. 32, manufacturing equipment such as tools 300 may, if desired, be used in forming individual parts 304 for device 10 and completed assemblies 302. Parts 304 may include housing structures such as housing 12, display structures such as chassis 28, light guide plate 22, and other structures associated with device 10. Parts 304 may be manufactured individually using a first set of one or more tools (e.g., manufacturing tools) and subsequent assembly operations may be performed using one or more additional tools (e.g., press fitting tools or other assembly tools). In this type of arrangement, some or all of the parts may be manufactured in advance and subsequently assembled to form completed assemblies such as assembly 302. For example, chassis 28 may be formed by forming structures 30, 32 and/or housing 12 separately and subsequently press fitting one or more of these parts together. Arrangements such as these may use multiple types of tools. For example, a light guide plate such as plate 22, a light reflecting structure such as structure 32, and a light blocking structure such as structure 30 may be formed separately and, following their separate formation, may be assembled mechanically to form display backlight structures. As another example, light reflecting layer 32 may be injection molded over the edge of light guide plate 22 using an injection molding tool. This structure may then be mechanically attached to a pre-formed light blocking structure 30 (e.g., by press-fitting or other mechanical assembly techniques). Yet another example involves the formation of thin-film stacks and metal coatings for reflective layers 32. These reflective layers may be formed over a previously formed light blocking layer such as light blocking layer 30' of FIGS. 29 and 30 or may be formed as stand-alone parts that are press fit into layer 30' or other structures for device 10. Chassis 28 may, if desired, be formed by press-fitting structures 30 and 32 together (or injection molding structures 30 and 32 together using two-shot molding techniques) and subsequently assembling light guide plate 22 and chassis 28 mechanically (e.g., by press fitting).

Using techniques such as these, chassis 28 may be created separately from light guide plate 22. For example, chassis 28 may be formed by injection molding (e.g., to injection mold structures 30 and 32 to form an integral chassis), chassis 28 may be formed mechanically (e.g., by molding, cutting, machining, or otherwise forming material into separate structures 30 and 32 and then press fitting the separate structures 30 and 32 together to form chassis 28), or may be formed using other manufacturing processes. Light guide plate 22 may be formed separately from chassis 28. For example, light guide plate 22 may be formed using molding equipment, using cutting equipment such as die cutting equipment to cut a sheet of material for light guide plate 22 from a larger sheet, by extruding light guide plate 22 or a sheet of material from which light guide plate 22 is cut, or using other suitable light guide plate manufacturing techniques. Separately formed structures such as a separately formed chassis and light guide plate may then be assembled to form a backlight assembly. For example, press fitting techniques or other techniques may be used to mechanically assemble the chassis and light guide plate to form a backlight assembly.

The structures formed using tools 300 (shown schematically as assembly 302 in FIG. 32) may be, for example, a completed chassis such as chassis 28, a backlight assembly that includes chassis 28 and additional structures such as light guide plate 22, an electronic device assembly that includes structures such as chassis 28, light guide plate 22, and/or housing 12, or other suitable device structures. If desired, multiple portions of an assembly may be formed using the same tool or set of tools. For example, multiple structures such as structures 30 and 32 may be injection molded to form a unitary backlight chassis and/or may be injection molded to other structures (e.g., housing structures and/or a light guide plate, etc.).

Equipment 300 may include die cutting tools, machining tools such as grinding and milling tools, laser cutting tools, welding tools, mechanical assembly tools such as tools for press fitting parts together, tools for exposing workpieces to light and/or heat, tools for applying coatings such as physical vapor deposition tools for depositing layers of dielectric and metal (e.g., to form a thin-film stack or metal coating), electrochemical deposition tools, photolithography tools, tools for patterning conductive materials such as metallic paint and other liquids (e.g., painting tools, pad printing tools, screen printing tool, ink jet tools, dipping tools, spraying tools, etc.), tools for injection molding plastic, tools for soldering, ovens and other tools for applying heat, equipment for bending structures, and other suitable manufacturing and assembly tools.

The foregoing is merely illustrative of the principles of this invention and various modifications can be made by those skilled in the art without departing from the scope and spirit of the invention.

What is claimed is:

1. Backlight structures for an electronic device display, comprising:
    a rectangular light guide plate;
    a light source that launches backlight into an edge surface of the rectangular light guide plate; and
    a rectangular ring-shaped plastic chassis that surrounds the rectangular light guide plate, wherein the rectangular ring-shaped plastic chassis includes at least a first plastic structure and a second plastic structure formed from a different plastic material than the first plastic structure, wherein the second plastic structure forms an exterior surface of the rectangular ring-shaped plastic chassis that is parallel to the edge surface of the light guide plate, wherein the first plastic structure is interposed between the edge surface of the light guide plate and the second plastic structure that forms the exterior surface of the rectangular ring-shaped plastic chassis, wherein the first plastic structure extends noncontinuously around the rectangular light guide plate, and wherein a portion of the chassis opposite the light source is formed exclusively of material from the second plastic structure.

2. The backlight structures defined in claim 1 wherein the first plastic structure is configured to form an inner surface along at least one interior edge of the rectangular ring-shaped plastic chassis.

3. The backlight structures defined in claim 2 wherein the first plastic structure comprises white plastic.

4. The backlight structures defined in claim 2 wherein the first plastic structure comprises a rectangular ring of light reflecting plastic.

5. The backlight structures defined in claim 2 wherein the first plastic structure is configured to form a light reflecting surface along at least two sidewalls of the rectangular ring-shaped plastic chassis.

6. The backlight structures defined in claim 5 wherein the second plastic structure comprises black plastic.

7. The backlight structures defined in claim 6 wherein the first plastic structure comprises white plastic.

8. The backlight structures defined in claim 5 wherein the chassis has first, second, third, and fourth edges, wherein the first and third edges are parallel, wherein the second and fourth edges are parallel, and wherein the first and third edges of the chassis are formed exclusively of material from the second plastic structure.

9. The backlight structures defined in claim 5 wherein the chassis has first, second, third, and fourth edges, wherein the first and third edges are parallel, wherein the second and fourth edges are parallel, and wherein the first edge of the chassis is formed exclusively of the material from the second plastic structure.

10. The backlight structures defined in claim 1 wherein the first plastic structure comprises light reflecting plastic, wherein the second plastic structure comprises light blocking plastic, wherein the light reflecting plastic is more reflective than the light blocking plastic, wherein at least some of the second plastic structure forms a sidewall portion of the rectangular ring-shaped chassis, and wherein at least some of the first plastic structure is located along an inner surface of the sidewall portion.

11. A backlight structure, comprising:
a light guide plate having an edge surface that receives light from a light source; and
a chassis that surrounds the light guide plate, wherein the chassis includes a first injection molded plastic structure and a second injection molded plastic structure, wherein the first injection molded plastic structure forms an interior surface of the chassis, wherein the second injection molded plastic structure forms an exterior surface of the chassis, wherein the interior and exterior surfaces of the chassis are parallel to the edge surface of the light guide plate, wherein the interior surface is interposed between the edge surface of the light guide plate and the exterior surface of the chassis, wherein the second injection molded plastic structure completely surrounds the light guide plate, wherein the first injection molded plastic structure surrounds only a portion of the light guide plate, and wherein a portion of the light guide plate that is not surrounded by the first injection molded plastic structure is opposite the edge surface of the light guide plate that receives light from the light source.

12. The backlight structure defined in claim 11 wherein the second injection molded plastic structure is more opaque than the first injection molded plastic structure and wherein the first injection molded plastic structure is injection molded on at least one peripheral edge of the light guide plate.

13. The backlight structure defined in claim 12 wherein the first and second injection molded plastic structures are molded to each other along at least one edge.

14. The backlight structure defined in claim 11 wherein the chassis has four edges, wherein the first injection molded plastic structure comprises white plastic, wherein the second injection molded plastic structure comprises black plastic, and wherein at least some of the black plastic surrounds each of the four edges of the chassis.

15. A backlight structure, comprising:
a light guide plate having a peripheral edge surface;
a light source that emits light in to the peripheral edge surface of the light guide plate; and
a chassis that surrounds the light guide plate, wherein the chassis includes an outer structure and a metal coating on an interior surface of the outer structure, wherein the interior surface is parallel to the peripheral edge surface, wherein the metal coating is configured to reflect light into the light guide plate through the peripheral edge surface, and wherein the light emitted into the peripheral edge surface of the light guide plate is incident upon a portion of the interior surface of the outer structure opposite the peripheral edge surface into which the light source emits light.

16. The backlight structure defined in claim 15 wherein the outer structure comprises plastic.

17. A backlight structure, comprising:
a light guide plate having a peripheral edge surface;
a light source that emits light in to the peripheral edge surface of the light guide plate; and
a chassis that surrounds the light guide plate, wherein the chassis includes an outer light absorbing structure and a thin-film stack on an interior surface of the outer light absorbing structure, wherein the interior surface is parallel to the peripheral edge surface, wherein the thin-film stack is configured to reflect light into the light guide plate through the peripheral edge surface, and wherein the light emitted into the peripheral edge surface of the light guide plate is incident upon a portion of the interior surface of the outer light absorbing structure opposite the peripheral edge into which the light source emits light.

18. The backlight structure defined in claim 17 wherein the thin-film stack includes a plurality of dielectric layers of differing indices of refraction.

19. The backlight structure defined in claim 18 wherein the outer light absorbing structure comprises a ring-shaped structure formed from plastic.

* * * * *